United States Patent
Roeser

[11] 3,825,723
[45] July 23, 1974

[54] TEMPERATURE AND HUMIDITY TEST APPARATUS

[75] Inventor: John O. Roeser, Arlington Heights, Ill.

[73] Assignee: Otto Engineering, Inc., Carpentersville, Ill.

[22] Filed: Feb. 14, 1973

[21] Appl. No.: 332,376

[52] U.S. Cl.............. 219/401, 21/119, 34/225, 126/369, 219/362, 219/400, 219/439, 236/44 C, 261/130, 261/131
[51] Int. Cl............................................. F27d 11/02
[58] Field of Search ........... 219/276, 362, 375, 400, 219/401, 431, 440, 385; 34/196, 197, 225, 231; 21/119; 126/21 A, 369; 165/3, 4, 19, 107; 236/44 R, 44 E, 44 C; 261/129, 130, 131

[56] References Cited
UNITED STATES PATENTS

| | | | |
|---|---|---|---|
| 1,721,840 | 7/1929 | Smith................................ | 219/400 X |
| 2,357,634 | 9/1944 | Crites................................ | 219/440 |
| 2,469,778 | 5/1949 | Morici............................... | 126/369 |
| 2,659,805 | 11/1953 | Warren............................. | 219/440 |
| 2,715,898 | 8/1955 | Michaelis et al................. | 219/400 X |
| 3,245,461 | 4/1966 | Allington........................ | 235/44 R X |
| 3,424,231 | 1/1969 | Truhan............................. | 165/19 |
| 3,549,860 | 12/1970 | Parker et al..................... | 219/400 |
| 3,586,516 | 6/1971 | Terc................................. | 219/400 X |
| 3,604,895 | 9/1971 | McKay............................ | 219/401 |
| 3,609,296 | 9/1971 | Blair................................. | 219/400 |
| 3,609,297 | 9/1971 | Christopoulos................. | 219/439 |

Primary Examiner—Volodymyr Y. Mayewsky

[57] ABSTRACT

An apparatus is provided for subjecting specimens such as electric switches and other components to a temperature and humidity controlled environment, particularly to a cycling environment which involves changes in relative humidity and temperature. The apparatus includes an inner drum nested within an outer drum so that the walls of the inner drum are spaced from the walls of the outer drum. The inner drum provides the specimen chamber, and an air inlet and air outlet are provided through the bottom and the top, respectively, of the inner drum. The bottom portion of the outer drum below the bottom of the inner drum serves as a water reservoir, and an electric heater is mounted on the bottom of the outer drum for heating the water contained in the outer drum. A thermostat within the water is operatively connected to the heater to maintain the temperature of the water at the desired level. A second heater is mounted within the inner drum adjacent the air inlet, and electrical control means are connected to the second heater so that the second heater supplies a constant amount of heat. An air blower or impeller is mounted on the outer drum above the air outlet of the inner drum, and the air impeller provides air flow from the air outlet, around the sides of the inner drum, over the water reservoir, through the air inlet, and through the specimen chamber. The air is heated to just below the desired test temperature as it passes over the heated water and becomes saturated with water. As the air passes through the air inlet into the specimen chamber, the seacond heater supplies just enough heat to raise the temperature of the air to the desired test temperature and to decrease the relative humidity of the air to the desired test humidity. Wet bulb and dry bulb thermocouples may be mounted within the specimen chamber and connected to a suitable recording device to record the wet bulb and dry bulb temperature conditions within the specimen chamber.

14 Claims, 4 Drawing Figures

PATENTED JUL 23 1974 3,825,723

TEMPERATURE AND HUMIDITY TEST APPARATUS

BACKGROUND

This invention relates to a temperature and humidity test apparatus, and, more particularly, to an apparatus which is capable of subjecting specimens to a cycling environment in which the temperature and relative humidity changes.

The invention finds particular utility with respect to various military specifications such as MIL Standard 202 Method 106C. Such military specifications typically require cycling of the temperature and relative humidity within the specimen chamber within very close tolerance limits that are very difficult to achieve. For example, MIL Standard 202 Method 106 requires cycling from 25°C. to 65°C., maintaining the temperature at 65°C. for a period of time, and returning the temperature to 25°C., all while maintaining the relative humidity within specified ranges. This cycle is completed twice a day, and the test may last for as many as ten days.

Several temperature and humidity chambers are available for performing the tests required by various military specifications. However, these chambers are generally rather complex in construction and expensive. Further, the complexity of the structure increases the maintenance that is required to keep the apparatus clean and functioning as required.

A typical test apparatus consists of a specimen chamber positioned within an outer closely fitting cabinet which allows the air to be processed for the desired humidity. A control unit is attached to the cabinet which controls the cycling of the temperature, and the relative humidity is determined from recordings obtained from wet and dry bulb recorders. The control of the humid air circulating in the chamber is achieved by directing the air from the specimen chamber through refrigeration coils which remove moisture from the air, thereby lowering the relative humidity of the air. The relatively dry air is then passed over an open pan of heated water which is maintained just a few degrees below the temperature of the specimen chamber. As the air passes over the heated water, it is heated and humidified to saturation at the temperature of the water. The air then passes through heating coils which raise the temperature of the air a few degrees, thereby decreasing the relative humidity.

If the process is controlled correctly, the air arrives in the specimen chamber at the proper temperature and relative humidity. However, this requires that both the temperature of the water and the temperature of the heating coils be accurately controlled. With prior art apparatus this control is generally accomplished by programming the temperature of both of these heat sources so that the desired temperature and humidity is obtained at the appropriate times. This programming may be done, for example, by constructing a pair of cams each of which are cut to an outline that is intended to provide the proper temperature when the cam is used with a temperature controller mechanism having a cam follower. The cams do not control the heat input devices directly but serve to change the settings of two separate thermostatic devices in order to follow the temperature envelope curve of the test specification.

SUMMARY

The invention provides a temperature and humidity apparatus which is simple and economical yet capable of reliably controlling the temperature and humidity within the specimen chamber in accordance with cycling specifications. The apparatus can be constructed of readily available components, and only a single thermostatic control is required. This thermostatic control can be provided by conventional commercially available thermostats, and the need for precision cams is eliminated. The apparatus utilizes two nested standard stainless steel drums which are readily available, relatively inexpensive, and easy to clean. The inner drum provides the specimen chamber, and the outer drum serves as the container for the saturating water and provides an air flow path around the outside of the inner drum. The outer drum also serves as a refrigerator since as the air flows downwardly between the walls of the two drums, it is cooled by contact with the outer drum. Some moisture will thereby condense on the inside of the outer drum, and this moisture will drain downwardly to the water reservoir. The only thermostatic control required serves to maintain the temperature of the water slightly below the maximum temperature of the test specification when the water heater is operating. A second heater within the inner drum supplies a small, constant amount of heat to the air which flows into the inner drum. The control system is based on the fact there is a constant weight of air per minute flowing through the specimen chamber because the inlet and outlet openings are of constant size and the speed of the fan is constant. Therefore, to raise the temperature of the air a given number of degrees, it is only necessary to introduce a constant number of BTU's depending upon the mass flow of the air. The required number of BTU's supplied to the air can be obtained by adjusting the voltage supplied to the electric heater within the inner drum.

DESCRIPTION OF THE DRAWING

The invention will be explained in conjunction with an illustrative embodiment shown in the accompanying drawing, in which.

DESCRIPTION OF SPECIFIC EMBODIMENT

Figure 1:
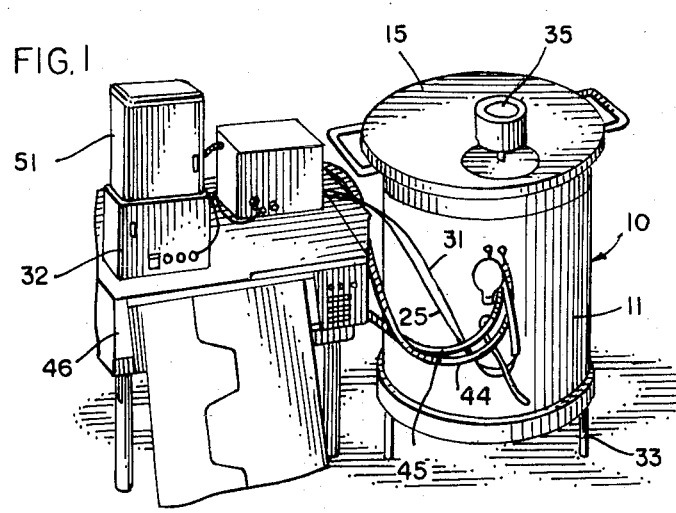
FIG. 1 is a perspective view of the test apparatus and related equipment.
Figure 3:
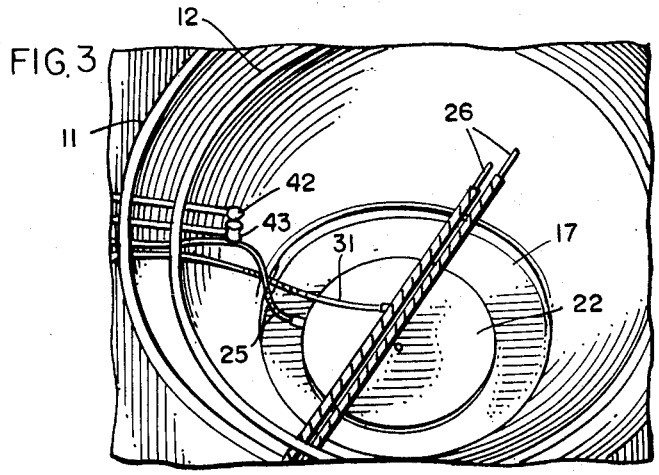
FIG. 3 is a fragmentary perspective view into the interior of the drums of the apparatus with the covers of the drums removed.
Figure 4:
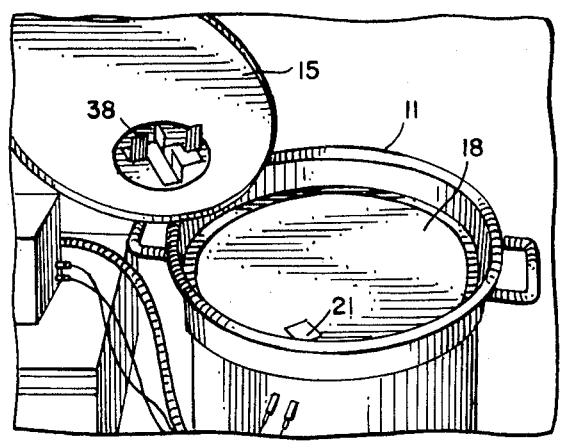
FIG. 4 is a perspective view of the apparatus with the cover of the outer drum removed.
Figure 2:
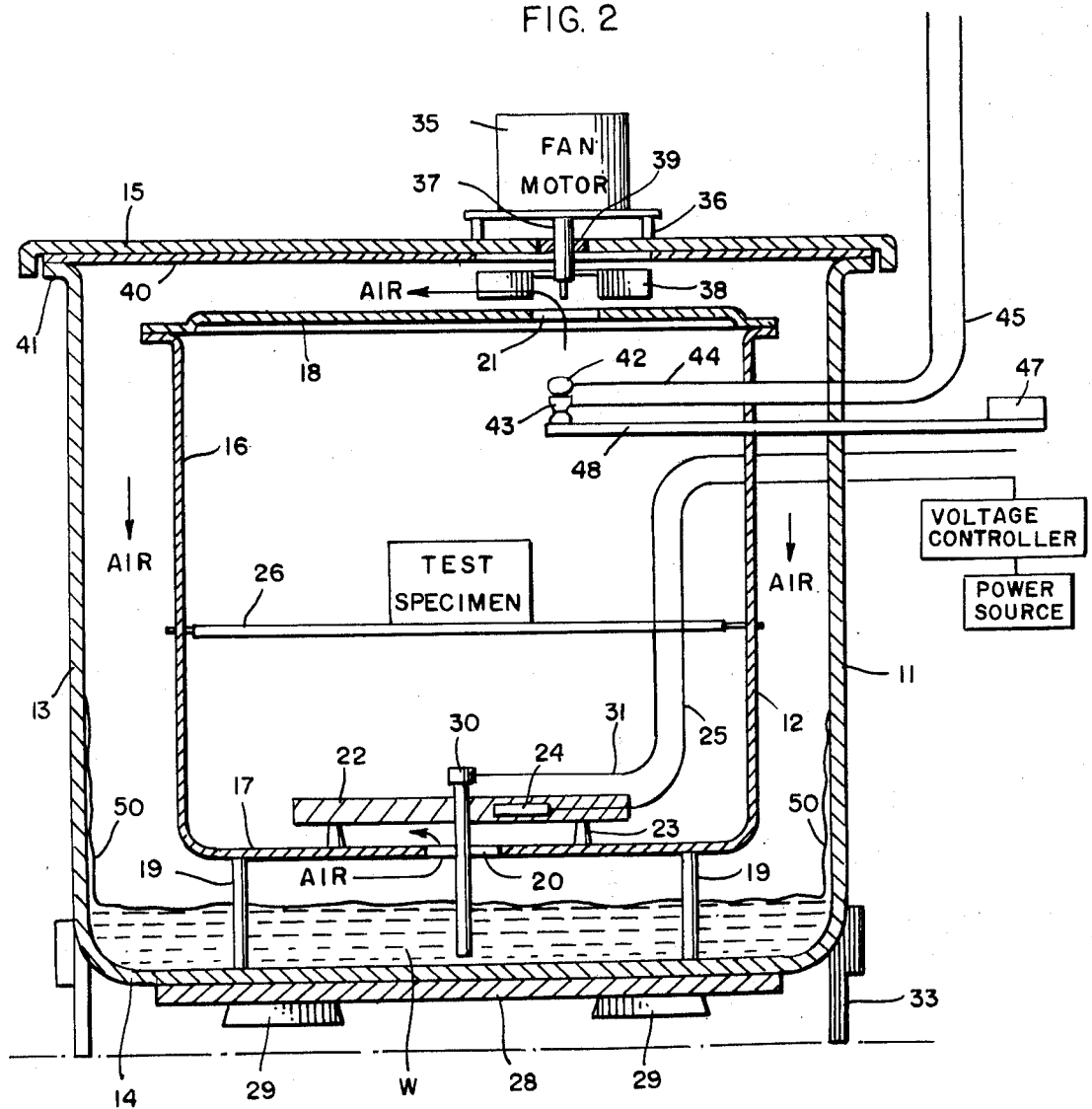
FIG. 2 is an elevational sectional view through the test apparatus.

Referring to the drawing, the numeral 10 designates generally a temperature and humidity apparatus which includes an outer cylindrical drum 11 and an inner cylindrical drum 12 nested within the outer drum. The outer drum includes a cylindrical side wall 13, a bottom wall 14, and a removable cover 15. Similarly, the inner drum 12 includes a cylindrical side wall 16, a bottom wall 17, and a removable cover 18. The drums can be conventional, commercially available stainless steel drums, and in one specific embodiment of the invention, I used a 31 gallon outer drum and a 20 gallon inner drum.

The inner drum 12 is provided with support legs 19 which support the bottom of the inner drum above the bottom of the outer drum, and three support legs can be spaced around the periphery of the inner drum at intervals of about 120°. An air inlet opening 20 is provided through the central portion of the bottom wall of the inner drum, and an air outlet opening 21 is provided through the cover 18. A disc-like aluminum heating plate 22 is supported slightly above the bottom wall of the inner drum by supports 23, and the heating plate extends radially outwardly a substantial distance beyond the periphery of the air inlet opening 20. An electric heating cartridge 24 is positioned within the heating plate and connected by a wire 25 to a suitable electric power source which includes a variable voltage controller. A pair of specimen support rods 26 extend generally diametrically across the inner drum and extend through the cylindrical side wall of the drum. The rods 26 serve to support the test specimen within the specimen chamber provided by the inner drum.

The bottom portion of the outer drum 11 serves as a water reservoir for water W which is filled to a level somewhat below the bottom of the inner drum. An aluminum heating plate 28 is attached to the outer surface of the bottom of the outer drum, and a pair of electric heating elements 29 are attached to the heating plate. The heating plate extends over a substantial portion of the bottom wall of the outer drum so that the water contained by the outer drum is heated substantially uniformly through out. A thermostat 30 is immersed in the water and extends upwardly through the air inlet opening 20 and through the heating plate 22 above the inlet. A wire 31 extends through the side walls of the drums and connects the thermostat to a temperature controller 32 (FIG. 1) which is associated with the heating elements 29 as will be explained more fully hereinafter. The temperature sensing element of the thermostat 30 is positioned at the lower end thereof within the water, and the thermostat extends through the heating plate 22 merely to facilitate the connection of the thermostat to the exterior of the apparatus. The bottom of the outer drum and the heating elements 29 are supported above the supporting surface for the apparatus by support legs 33.

An electric motor 35 is mounted on the outside of the cover 15 of the outer drum by supports 36, and the drive shaft 37 of the motor extends through an opening in the cover 15 and supports an impeller or fan 38 which is positioned directly above the outlet opening 21 in the inner drum. The opening in the cover 15 for the motor shaft is sealed by a lapped face seal 39 such as commonly used in refrigeration compressors to prevent loss of moisture through this opening. A layer of polyurethane foam 40 is attached to the inside surface of the cover 15 to provide a seal between the cover and the radially outwardly extending flange 41 on the side wall of the outer drum. The polyurethane also serves to insulate the cover to permit the cover to be removed from the outer drum more readily when desired.

A dry bulb thermocouple 42 and a wet bulb thermocouple 43 are mounted within the inner drum below the outlet opening 21 and connected by wires 44 and 45, respectively, to a recording device 46 (FIG. 1). A container 47 of distilled water supplies water to the wet bulb thermocouple through pipe 48 which extends through the walls of the drums.

A constant air flow through the specimen chamber is established by the impeller 38. The air flows from the outlet 21 across the top of the inner drum, downwardly between the sides of the two drums across the water, and through the inlet 20. The water is heated to a temperature a few degrees below the temperature which is desired within the specimen chamber, and as the air flows over the water, it becomes heated to the temperature of the water and becomes saturated at the water temperature. As the air flows through the inlet opening 20 and around the heating plate 22, the temperature of the air is raised to the desired test temperature. Since the temperature of the air is raised, its relative humidity will be lowered, and the amount of heat supplied by the heating plate 22 is just sufficient to raise the temperature of the air the amount required to bring the air to the desired temperature and humidity.

The only thermostatic control required is the thermostatic control 32 associated with the thermostat 30 for the water. No thermostatic control is required for the heating element 24 which heats the heating plate 22, and a constant voltage is supplied to the heating element during the test so that heat is given off by the heating plate at a constant rate. The test apparatus operates on the basis of a constant flow of air through the specimen chamber by virtue of the constant impeller speed and the fixed size of the inlet and outlet openings. This means that there is a constant weight of air per minute flowing through the chamber. Accordingly, in order to raise the temperature of the air which flows into the chamber a given number of degrees, all that is required is to supply a constant number of BTU's in accordance with the mass flow of the air. If the air flow is known, the amount of heat required to raise the temperature of the air to the desired specimen temperature can be calculated, and the voltage on the heating element 24 can be adjusted accordingly by the variable voltage controller for this heating element. This voltage control can be a Variac controller or any other suitable continuous type control for adjusting the voltage and therefore the current.

The temperature to which the water is heated is selected to provide the necessary differential between the water temperature and the desired temperature of the test specimen to lower the relative humidity of the air from 100 percent to the desired humidity for the specimen by virtue of the heat which is added to the air by the heating plate 22. This differential can be easily determined from standard psychrometric tables.

As the air flows out of the specimen chamber through the outlet opening 21 and through the air passage between the drums, the air is cooled by the surfaces of the outer drum. Because of the cooling, some moisture will condense on the inner surface of the drum, and this moisture will drain downwardly along the inside of the wall of the drum as indicated at 50 to the sump or reservoir at the bottom of the drum where the condensed water will again be heated to the saturation temperature. The cooling of the air conditions the air to be heated again to the desired saturation temperature as it passes over the surface of the heated water, and the air will maintain a continuous cycling.

The dry bulb and wet bulb thermocouples 42 and 43 are connected to a conventional recorder 46 so that the dry bulb and wet bulb readings within the specimen chamber can be recorded. I have used a Schlumberger strip chart recorder with good results.

In the operation as previously described, the amount of heat required to be supplied by the heating plate 22 to the air flowing into the specimen chamber was calculated on the basis of the rate of air flow. However, since the dry bulb and wet bulb thermocouples 42 and 43 will indicate the dry bulb and wet bulb temperatures within the specimen chamber, the proper voltage to be applied to the heating element 24 and the proper temperature to heat the water within the outer drum in order to bring the inflowing air to the desired temperature and humidity can be determined without knowing the rate of air flow merely by adjusting the voltage controller for the heating element 24 and the thermostatic control 32 for the heating elements 29 until the recorder 46 indicates the appropriate dry bulb and wet bulb readings. Once the voltage controller and the thermostatic controls are set, then current is supplied continuously to the heating element 24 so that the heating plate 22 gives off a constant amount of heat. Once the thermostatic control 32 is set, it will turn the heating element 29 on and off as necessary to maintain the water at the desired temperature.

Many specifications require cycling of the temperature within the specimen chamber while the humidity is maintained within certain ranges. For example, military specification MIL Standard 202 Method No. 106C requires cycling between 65°C. and 25°C. while the relative humidity is maintained at least between 90 percent and 98 percent. During some portions of the cycle the humidity is permitted to vary within the range of 80 to 98 percent. The minimum temperature of 25°C. is approximately room temperature, and for purposes of bringing the temperature within the specimen chamber down to the minimum temperature, the test apparatus can be operated within a room having a controlled temperature of a few degrees below 25°C.

When the temperature within the specimen chamber is required to be brought down from 65°C. to 25°C., the current to the heating elements 29 can be shut off, and this can be easily accomplished by connecting the power line for the heating elements to a timer 51 (FIG. 1). The impeller motor 35 will continue to operate at a constant speed, and a constant voltage will continue to be supplied to the heating element 24 within the inner drum. However, the temperature of the water will eventually fall to room temperature, i.e., a few degrees below 25°C. Heat will continue to be given off by the heating plate 22 at a constant rate, but this heat is only enough to raise the temperature of the incoming air a few degrees and is not sufficient to maintain the temperature of the water above room temperature. For example, in one specific embodiment of the apparatus a heat input of about 25 watts to the heating plate was sufficient to raise the air a few degrees in order to achieve the controlled humidity. Since the rate of air flow remains constant and the amount of heat being supplied to the incoming air in the inner chamber remains constant, the number of degrees which the temperature of the incoming air is raised remains constant even though the air is being cooled from 65°C. to 25°C. The amount of heat that is added to the incoming air is sufficient to bring the humidity of the air within the specimen chamber within the required humidity range.

At times it may be desirable to switch the voltage of the heating element 24 to a lower level during the cooling portion of the cycle, and this can be done by connecting the voltage controller to the same control which switches off the heating elements 29.

The rate of change of temperature from 65°C. to 25°C. is not specified in the specification, the only requirement being that the temperature be brought from 65°C. to 25°C. within a certain period of time. Accordingly, I have found it unnecessary to provide cooling or refrigerating means to reduce the temperature of the water and the air, natural convection usually being sufficient to cool the chamber. If faster cooling is desired, this can be achieved by positioning an ordinary small fan near the outside of the outer drum or under the bottom of the drum to cool the outside of the outer drum.

When the temperature within the specimen chamber is required to be increased again to 65°C. in accordance with the specification, the timer 51 switches on current to the heating elements 29 to heat the water. When the heating elements bring the water to the required temperature a few degrees below 65°C., the thermostat 30 and the thermostatic control 32 will switch off the current to the heating elements and will thereafter continue to switch the current to the heating elements on and off as necessary to maintain the desired temperature. A constant amount of heat will continue to be supplied by the heating element 24 and the heating plate 22 throughout the cycle, and this heat will raise the temperature of the incoming air sufficiently to bring the humidity of the air within the required humidity range.

If the test specification calls for a different minimum temperature, then the room temperature can be set a few degrees below the required minimum so that the heat supplied by the heating plate 22 will raise the temperature of the incoming air to the required minimum when the water is at room temperature. In the event that a specification required a minimum temperature lower than the temperature at which the room can be conveniently kept, refrigeration means can be provided around the outer drum to decrease the temperature of the water to the required temperature.

If the specification requires that the temperature within the specimen chamber be maintained at one or more levels between the maximum and the minimum temperatures, then a thermostat could be provided for each of the intermediate temperature levels so that the temperature of the water could be maintained at the appropriate temperature for each level. Other means for maintaining the water temperature at a number of different levels during a cycle could also be used.

The outer drum serves as the container for the water, and the inner drum is entirely surrounded by air which is being cycled through the conditioning process. There are no other paths for heat to be gained or lost by the inner drum, and insulation of this drum is not required. This is in marked contrast to rather extensive insulation which is required on many competitive chambers. Despite the absence of insulation the inner specimen chamber has very low temperature gradients therewithin. SInce the drums are standard drums which are commercially available, they are relatively inexpensive, and the stainless steel drums are easy to clean and do not have dirt-accumulating crevices or the like.

Although the seal between the cover of the outer drum and the wall of the outer drum is simple, the seal is sufficient that there is practically no loss of moisture during a typical 10 day test. Accordingly, it is unnecessary to have complex water conditioning apparatus for supplying water to the water reservoir. An initial amount of distilled water is merely added at the beginning of the test run, and this will be sufficient to last throughout the complete test without further additions. For example, in one specific embodiment of the apparatus, 1 gallon of distilled water was poured into the outer drum at the beginning of the test, and no additional water was required throughout a ten day test.

While in the foregoing specification a detailed description of a specific embodiment of the invention was set forth for the purpose of illustration, it is to be understood that many of the details herein given may be varied considerably by those skilled in the art without departing from the spirit and scope of the invention.

I claim:

1. A temperature and humidity test apparatus comprising an outer casing, an inner casing mounted within the outer casing and providing an inner specimen chamber, the inner casing being provided with air inlet and air outlet means and otherwise providing an enclosed specimen chamber, at least a portion of the inner casing being spaced from the outer casing to provide an air flow path between the inner casing and the outer casing from the air outlet to the air inlet, impeller means for forcing air to flow from the air outlet to the air inlet and through the specimen chamber, a water reservoir within the outer casing in the path of the air flow from the air outlet to the air inlet, support means for supporting the inner casing within the outer casing so that the air inlet in the inner casing is above water reservoir heating means for heating the water in the water reservoir and thereby heating the air as the air passes over the reservoir, within the inner casing adjacent the air inlet for heating the air after it passes through the air inlet, electric power means for supplying a constant amount of electric current to the electric heating element so that the electric heating element supplies a constant amount of heat to the air passing through the air inlet, and means for supporting a specimen within the specimen chamber.

2. The apparatus of claim 1 in which the electric power means includes variable voltage control means for supplying voltage for the electric heating element, the variable voltage control means being adjustable to provide a constant voltage of a desired value for the electric heating element whereby the electric heating element may continuously supply a constant and desired amount of heat to the air passing through the air inlet.

3. The apparatus of claim 1 including a thermostat connected to the heating means for maintaining the temperature of the air in front of the inlet substantially constant when the heating means is operating, and timer means connected to the heating means for turning the heating means on and off.

4. The apparatus of claim 1 in which the support means includes the inner casing above the bottom of the outer casing, the water reservoir being provided by the bottom of the outer casing below the bottom of the inner casing, the air inlet being provided through the bottom of the inner casing.

5. The apparatus of claim 4 in which the heating means is an electric heater mounted below the bottom of the outer casing for heating the bottom of the outer casing and the water contained within the outer casing.

6. The apparatus of claim 1 in which each of the inner and outer casings includes an outer wall, the inner casing being mounted within the outer casing so that the outer wall of the inner casing is spaced from the outer wall of the outer casing to provide the air flow path between the inner and outer casings and to insulate the inner casing from the outer casing.

7. A temperature and humidity test apparatus comprising an outer casing, an inner casing mounted within the outer casing and providing an inner specimen chamber, each of the inner and outer casings comprising a drum having a cylindrical side wall and a bottom wall and a removable cover, the inner drum being smaller than the outer drum and being nested within the outer drum so that the side walls of the drums are spaced apart, support means supporting and spacing the bottom wall of the inner drum above the bottom wall of the outer drum to provide a water reservoir within the outer drum below the bottom of the inner drum, the cover of the inner drum being spaced below the cover of the outer drum, an air inlet being provided through the bottom of the inner drum and an air outlet being provided through the cover of the inner drum, impeller means for forcing air to flow from the air outlet through the space between the side walls of the drums to the air inlet and through the inner drum, heating means for heating the water in the water reservoir and thereby heating the air as the air passes over the reservoir, an electric heating element within the inner drum adjacent the air inlet for heating the air after it passes through the air inlet, electric power means for supplying a constant amount of electric current to the electric heating element so that the electric heating element supplies a constant amount of heat to the air passing through the air inlet, and means for supporting a specimen within the inner drum.

8. The apparatus of claim 7 in which the heating means is an electric heater mounted below the bottom of the outer drum for heating the bottom of the outer drum and the water contained within the outer drum.

9. The apparatus of claim 7 in which the impeller means includes an air impeller mounted on the cover of the outer drum and positioned above the air outlet in the cover of the inner drum.

10. The apparatus of claim 7 in which the heating means is an electric heater mounted below the bottom of the outer drum for heating the bottom of the outer drum and the water contained within the outer drum, a thermostat positioned within the water and connected to the electric heater for maintaining the water at a predetermined temperature.

11. The apparatus of claim 10 including timer means connected to the electric heater for turning the electric heater on and off.

12. The apparatus of claim 7 including a thermostat connected to the heating means for maintaining the temperature of the water substantially constant when the first heating means is operating.

13. The apparatus of claim 12 including timer means connected to the heating means for turning the heating means on and off.

14. The apparatus of claim 7 in which the electric power means includes variable voltage control means for supplying voltage for the electric heating element, the variable voltage control means being adjustable to provide a constant voltage of a desired value for the electric heating element whereby the electric heating element may continuously supply a constant and desired amount of heat to the air passing through the air inlet.

* * * * *